W. A. VAN BRUNT & N. R. NELSON.
AGITATOR FOR FERTILIZER.
APPLICATION FILED FEB. 18, 1914.
1,151,742.
Patented Aug. 31, 1915.
2 SHEETS—SHEET 1.
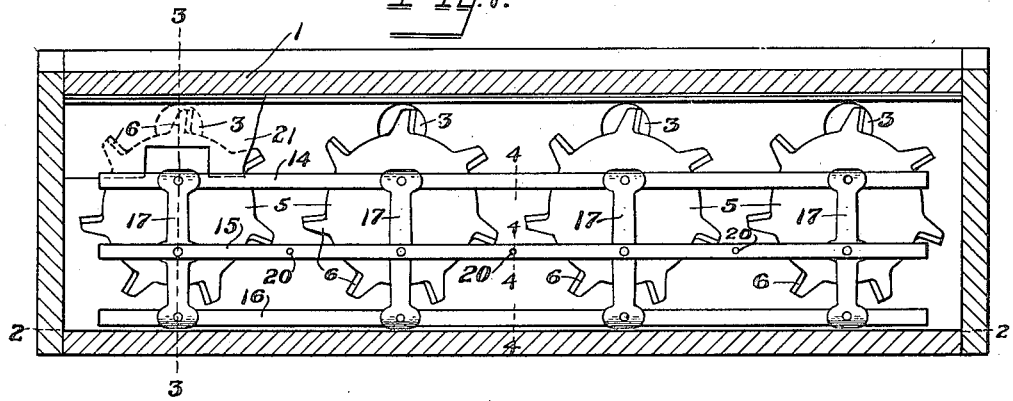
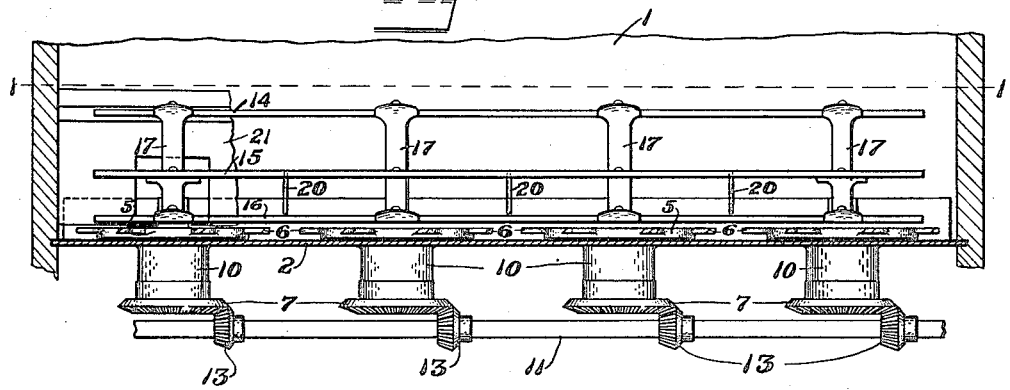

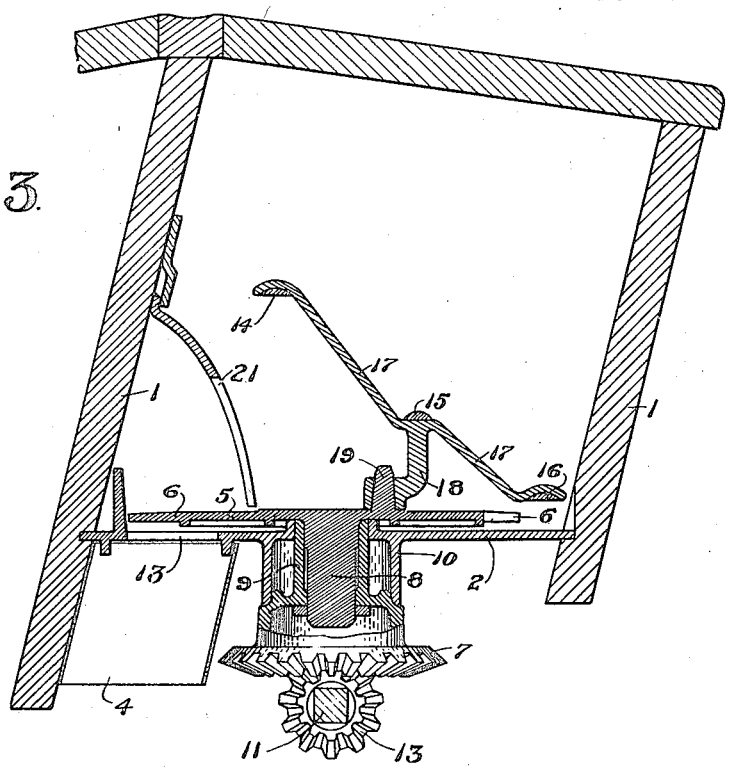
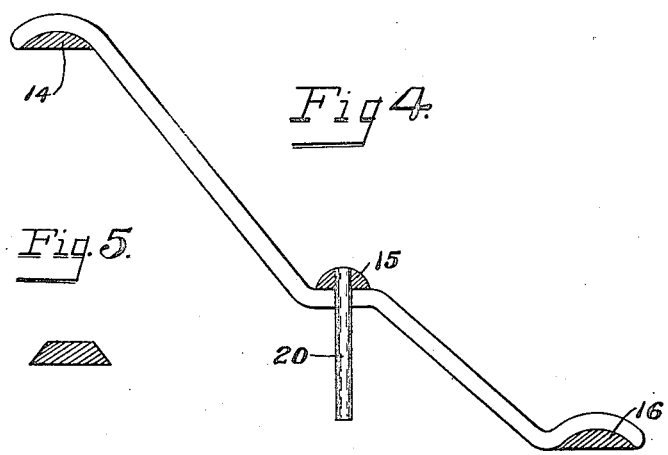

UNITED STATES PATENT OFFICE.

WILLARD A. VAN BRUNT AND NICHOLAS R. NELSON, OF HORICON, WISCONSIN, ASSIGNORS TO THE VAN BRUNT MANUFACTURING COMPANY, OF HORICON, WISCONSIN, A CORPORATION OF WISCONSIN.

AGITATOR FOR FERTILIZER.

1,151,742.  Specification of Letters Patent.  Patented Aug. 31, 1915.

Application filed February 18, 1914. Serial No. 819,389.

*To all whom it may concern:*

Be it known that we, WILLARD A. VAN BRUNT and NICHOLAS R. NELSON, citizens of the United States, residing at Horicon, in the county of Dodge and State of Wisconsin, have invented certain new and useful Improvements in Agitators for Fertilizer, of which the following is a specification.

This invention relates to improvements in fertilizer distributing machines.

The object of the invention is to provide simple and effective means for agitating the fertilizer within the hopper and prevent it from bridging over or sticking to the sides of the hopper.

In the accompanying drawings,—Figure 1 is a transverse section through the hopper on the line 1—1 of Fig. 2, so as to show a top plan view of the agitating devices, the shed plate being broken away. Fig. 2 is a section through the hopper on the line 2—2 of Fig. 1, showing the agitating devices and the distributing devices in side elevation, the shed plate being also broken away in this figure. Fig. 3 is a vertical section on the line 3—3 of Fig. 2. Fig. 4 is a section of the agitating frame proper, the section being on the line 4—4 of Fig. 1. Fig. 5 is a section of one of the bars of the agitating frame, showing a modification.

Like parts are represented by similar characters of reference throughout the several views.

In the said drawings, 1 represents the hopper in which the fertilizer to be distributed is placed, which hopper may form a part of the ordinary grain hopper of a seeding machine in which it is desired to sow a certain quantity of fertilizer with the seed. The hopper is provided with a metallic bottom 2 provided with a series of discharge openings 3 in the usual way through which the fertilizer is discharged into a suitable spout 4 to which may be connected the tubes which carry the fertilizer to the point of discharge. Rotatably mounted on the bottom 2 of the hopper is a series of fertilizer feed wheels 5, in the nature of star wheels, the teeth 6 of which are adapted to sweep over the discharge openings 3. Each of these star wheels is connected to the beveled gear 7, the star wheel being provided with a trunnion 8, secured within the hub 9 of the gear; said hub 9 being journaled in a suitable bearing 10 formed in the bottom 2. These beveled gears 7 are driven from the feed shaft 11 through the medium of beveled pinions 13 so that the distributer wheels 5 will be rotated to feed the fertilizer through the discharge openings 3.

The agitator consists of a frame made up of a series of longitudinal bars 14, 15 and 16 connected together by transverse bars 17; the construction being such that the three portions stand in different horizontal planes, the bar 16 being located near the bottom of the hopper, the bar 14 a considerable distance above the bar 16 and the central bar 15 centrally between the two. This agitator is of sufficient length to extend throughout the entire series of feed wheels in the small sized machines, but will be made in sections in the larger sizes. The agitator has each of its ends eccentrically pivoted to one of said wheels; each end of the central bar 5 being provided with a downwardly extending bracket 18 having an offset portion which is pivoted on an eccentrically-arranged stud 19 extending upwardly from the feed wheel 5.

Extending downwardly from the central bar 15 at points midway the respective feed wheels when the parts are in the position shown in Fig. 1, is a series of pins 20 which assist in agitating the fertilizer when the parts are in motion and prevent it from arching or bridging between the wheels.

As a result of this construction, it will be seen that the agitating frame, being eccentrically mounted on two of the feed wheels, will be given a curvilinear motion by the movement of said wheels, during which movement the lower horizontal bar will undermine and agitate the fertilizer that is inclined to cling to the inside wall of the hopper adjacent thereto and that the upper longitudinal bar will tend to undermine the fertilizer clinging to the inside of the opposite wall. The downwardly extending pins 20 also tend to agitate the fertilizer material in the lower central part of the hopper. The arrangement is such that the respective outside bars 14 and 16 during their movement will almost contact the respective sides of the hopper.

It is common in fertilizer distributers of this character to provide the hopper with a shed-plate 21, arranged above the discharge openings so as to protect the discharge openings and insure the proper feeding of the fertilizer by the feed wheels, which shed-plate projects upwardly for a considerable distance which makes it essential that the fertilizer material should be agitated at a point above the shed-plate, which I am enabled to accomplish by my arrangement of agitator frame having one of the bars arranged in a horizontal plane above the other bar or bars, and at the same time giving an improved agitating action upon the fertilizer material within the hopper. Also by this arrangement described, the agitating frame and its connections are entirely confined within the side and end walls of the hopper; that is, there are no connecting parts which project through the said walls, as in some prior constructions, thus obviating the danger of the fertilizer material clogging about such parts and the openings through which they enter, or leaking out.

Each of the bars 14 and 16 is formed of an oval shape in cross section and the bar 15 has a half round cross-sectional form, as shown in Figs. 3 and 4. This construction acts to prevent the agitating frame from having a tendency to rise up and slide over the fertilizer and thereby cause the fertilizer to pack below the frame; the action of the bars thus formed being to cut under and lift up the fertilizer. All of the bars may be formed of the half round shape or all of the half oval shape if desired, and other forms may be employed with equally good results such as the one shown in Fig. 5; the object being to have the upper side of each bar inclined upwardly and inwardly from its edges toward the center, with its under side flat, so as to provide sharpened cutting edges.

Having thus described our invention, we claim:

1. In a fertilizer distributer, a hopper, an agitating frame in said hopper having continuous sides extending parallel with the length of the hopper having one side in a higher plane than the opposite side, and means for moving the said frame in a curvilinear direction, whereby one side of the frame will move to a position in close proximity to one side of the hopper and the other side of the frame with the opposite side of the hopper, for the purpose specified.

2. In a fertilizer distributer, a hopper, feeding devices located within said hopper, means for operating same, agitating means comprising a plurality of devices extending substantially parallel with the length of the hopper and located in different horizontal planes, and means for operating same whereby the different sides of the agitating means will be brought close to the adjacent sides of the hopper, for the purpose specified.

3. In a fertilizer distributer, a hopper, a series of feed wheels in said hopper, and an agitating frame having continuous sides extending over the entire series of wheels and eccentrically pivoted to a plurality of said wheels, said frame being tilted at an angle so that one of its continuous sides will lie in a higher plane than the opposite side and both sides of said frame being adapted to be brought into close proximity to the respective sides of the hopper.

4. In a fertilizer distributer, a hopper, an agitator frame located in said hopper, together with means for moving the said frame in a curvilinear direction in said hopper, said frame consisting of three longitudinal bars connected together, each of said bars lying in a different plane from the other bars with the outside bars in the highest and lowest planes respectively.

5. In a fertilizer distributer, a hopper, an agitator frame located in said hopper, together with means for moving the said frame in a curvilinear direction in said hopper, said frame consisting of three longitudinal bars connected together, each of said bars lying in a different plane from the other bars with the outside bars in the highest and lowest plane respectively, and agitating pins extending downwardly from the central bar.

6. In a fertilizer distributer, a hopper, a series of feed wheels in said hopper, driving devices for said wheels, the connections between said driving devices and said wheel extending through the bottom of the said hopper, an agitator frame extending over the entire series of wheels and eccentrically pivoted to a plurality of said wheels so as to be moved in a curvilinear direction, one side of said frame lying in a higher plane than the other side, the construction and arrangement being such that such agitating frame and its driving connections will lie entirely within the sides of said hopper.

In testimony whereof, we have hereunto set our hands this 6th day of February 1914 A. D.

WILLARD A. VAN BRUNT.
NICHOLAS R. NELSON.

Witnesses:
 THEO. J. ERDMAN,
 EDW. A. FREI.